US008422686B2

(12) United States Patent
Cachin et al.

(10) Patent No.: US 8,422,686 B2
(45) Date of Patent: Apr. 16, 2013

(54) AUTOMATED VALIDATION AND EXECUTION OF CRYPTOGRAPHIC KEY AND CERTIFICATE DEPLOYMENT AND DISTRIBUTION

(75) Inventors: Christian Cachin, Thalwil (CH); Robert Haas, Adliswil (CH); Timothy J. Hahn, Cary, NC (US); Xiaoyu Hu, Horgen (CH); Ilias Iliadis, Rueschlikon (CH); Rene Pawlitzek, Kilchberg (CH); John T. Peck, Liberty Hill, TX (US)

(73) Assignee: International Business Machines Corporation, Armonk, NY (US)

( * ) Notice: Subject to any disclaimer, the term of this patent is extended or adjusted under 35 U.S.C. 154(b) by 523 days.

(21) Appl. No.: 12/142,009

(22) Filed: Jun. 19, 2008

(65) Prior Publication Data
US 2009/0316907 A1 Dec. 24, 2009

(51) Int. Cl.
*H04L 29/06* (2006.01)
(52) U.S. Cl.
USPC .......................................................... 380/278
(58) Field of Classification Search .................... 380/278
See application file for complete search history.

(56) References Cited

U.S. PATENT DOCUMENTS

| 6,088,362 | A  | * | 7/2000  | Turnbull et al. | 370/442 |
|-----------|----|---|---------|-----------------|---------|
| 6,611,511 | B1 | * | 8/2003  | Schulz          | 370/342 |
| 6,760,752 | B1 | * | 7/2004  | Liu et al.      | 709/206 |
| 6,789,193 | B1 | * | 9/2004  | Heiden          | 713/175 |
| 6,792,531 | B2 | * | 9/2004  | Heiden et al.   | 713/158 |
| 6,807,633 | B1 | * | 10/2004 | Pavlik          | 713/170 |
| 6,868,407 | B1 | * | 3/2005  | Pierce          | 705/60  |
| 7,023,817 | B2 | * | 4/2006  | Kuffner et al.  | 370/324 |
| 7,318,155 | B2 | * | 1/2008  | Yellepeddy      | 713/158 |
| 7,412,237 | B2 | * | 8/2008  | Takahashi et al. | 455/432.3 |
| 7,486,726 | B2 | * | 2/2009  | Alexander et al. | 375/232 |
| 7,636,381 | B2 | * | 12/2009 | Forenza et al.  | 375/141 |
| 7,813,510 | B2 | * | 10/2010 | Fu              | 380/279 |
| 2003/0187722 | A1 |   | 10/2003 | Kobayashi       |         |
| 2005/0147040 | A1 | * | 7/2005  | Vayanos et al.  | 370/235 |
| 2005/0177751 | A1 | * | 8/2005  | Chmora et al.   | 713/201 |
| 2007/0260878 | A1 |   | 11/2007 | Urivskiy et al. |         |
| 2008/0181413 | A1 | * | 7/2008  | Yi et al.       | 380/279 |
| 2008/0259825 | A1 | * | 10/2008 | Goldberg et al. | 370/278 |
| 2008/0307315 | A1 | * | 12/2008 | Sherman et al.  | 715/744 |

FOREIGN PATENT DOCUMENTS

| EP | 0 123 360     | 10/1984 |
|----|---------------|---------|
| JP | 59207759      | 11/1984 |
| JP | 2008-109662   | 5/2008  |

OTHER PUBLICATIONS

G. Ateniese, M. Steiner, and G. Tsudik. Authenticated Group Key Agreement and Friends. In Proceedings of the 5th (ACM) Conference on Computer and Communications Security ((CCS)-98), pp. 17-26, New York, 1998. ACM Press.*

C. Becker and U. Wille. Communication Complexity of Group Key Distribution. In 5th ACM Conference on Computer and Communications Security, San Francisco, California, Nov. 1998. ACM Press.*

(Continued)

*Primary Examiner* — Michael Simitoski
*Assistant Examiner* — Ali Shayanfar
(74) *Attorney, Agent, or Firm* — Shimokaji & Assoc., PC

(57) ABSTRACT

A method for automated validation and execution of cryptographic key and certificate deployment and distribution includes providing one or more keys; providing one or more key deployment points; and distributing the one or more keys to the one or more key deployment points in an automated manner based on a matrix or pattern mapping of each of the one or more keys to be distributed to each of the one or more key deployment points.

25 Claims, 12 Drawing Sheets

OTHER PUBLICATIONS

The PKI Working Group End User Deployment Matrix, The University of Texas Health Science Center at Houston, http://www.dartmouth.edu/~deploypki/net_at_edu/PKISurvey/PKI_deployment_matrix.html; Mar. 17, 2008.

European Search Report dated Jul. 2, 2009.

Fu-Yuan Lee et al: "Scalable and lightweight key distribution for secure group communications", International Journal of Network Management, [Online], vol. 14, No. 3, May 2004, pp. 167-176, Wiley, UK, XP002526491.

Xinxin Fan et al: "Key revocation based on Dirichlet multinomial model for mobile ad hoc networks", 33rd IEEE Conference on Local Computer Networks, 2008. LCN 2008, [Online], Oct. 14, 2008, pp. 958-965, XP031355974, IEEE, Piscataway, NJ, USA.

Marias G F et al: "Integrating a trust framework with a distributed certificate validation scheme for MANETs", Eurasip Journal on Wireless Communications and Networking 2006, [Online], vol. 2006, May 17, 2006, pp. 1-18, XP002526490, Hindawi Publishing Corporation US.

Inshil Doh et al: "Key Establishment and Authentication Mechanism for Secure Sensor Networks", Advanced Web and Network Technologies, and Applications Lecture Notes in Computer Science;LNCS3842, Jan. 1, 2005, pp. 335-344, XP019027208, Springer, Berlin, DE.

Medidi S et al: "A lightweight key distribution mechanism for wireless sensor networks", Proceedings of SPIE—the International Society for Optical Engineering—Wireless Sensing and Processing III 2008 SPIE US, [Online] vol. 6980, 2008, XP002526492.

Wong Leung K S et al: "An Efficient Data Mining Method for Learning Bayesian Networks Using an Evolutionary Algorithm-Based Hybrid Approach", IEEE Transactions on Evolutionary Computation, vol. 8, No. 4, Aug. 1, 2004, pp. 378-404, XP011117250, IEEE Service Center, New York, NY, US.

John W Sheppard et al: "On the Linear Separability of Diagnostic Models", IEEE Systems Readiness Technology Conference, Sep. 1, 2006, pp. 626-635, XP031009574.

Ole-Christoffer Granmo: "Automatisk feilhandtering i kommunikasjonssytemer ved hjeld av Bayesnettverk og msnstergjenkjenningsmetoder", Institutt for Informatikk, [Online] Feb. 4, 1999, pp. 1-91, XP002526493.

John Ganci, et al.,"Security hardening", IBM: Redbook, [Online] Aug. 25, 2004, pp. 471-571, XP002526494.

Japan Office Action dated Nov. 5, 2009.

Preview: Overview of IBM Tivoli Key Lifecycle Manager V1.0, IBM Product/Service Presentation Letter, Apr. 9, 2008, <Searched date: Nov. 4, 2009, URL: http://www-6.ibm.com/jp/domino02/NewAIS/aisextr.nsf/ByLetterNo/TIV08016?OpenDocument&ExpandSection=1.

* cited by examiner

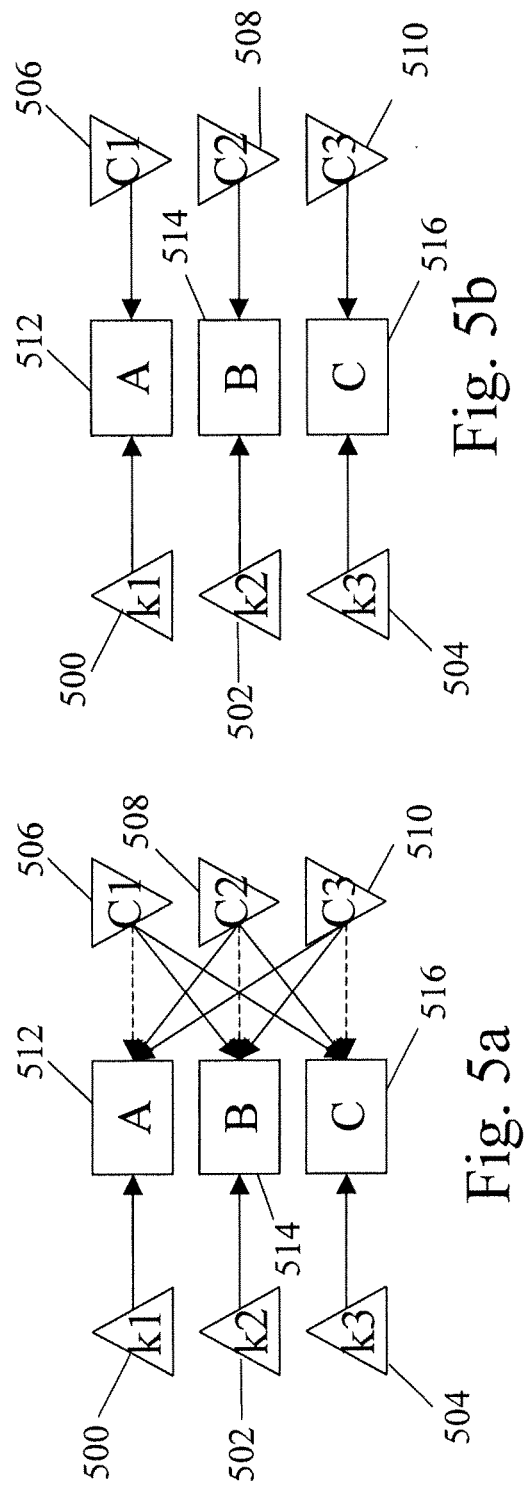

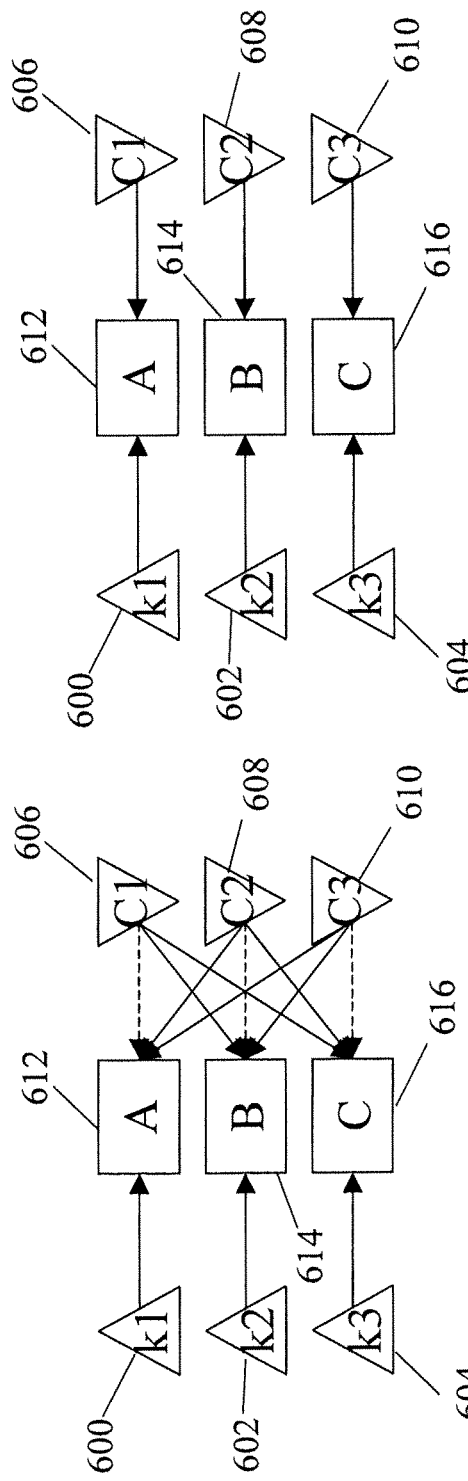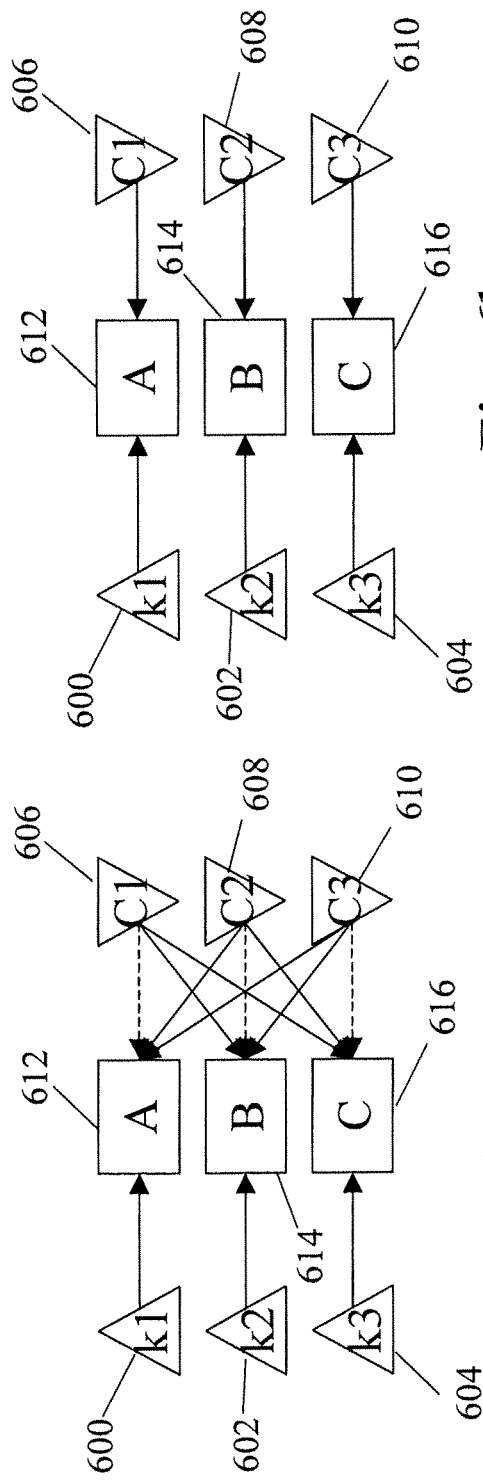
Fig. 6a
Fig. 6b
Fig. 6

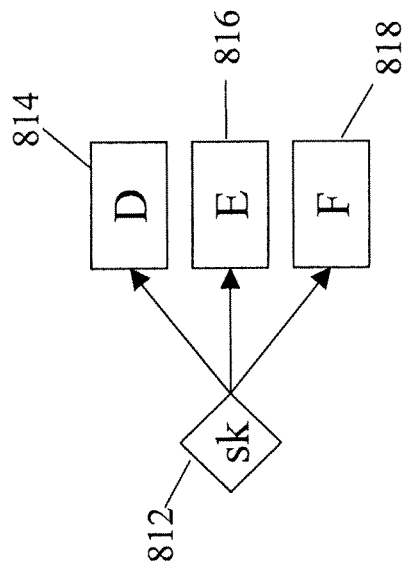
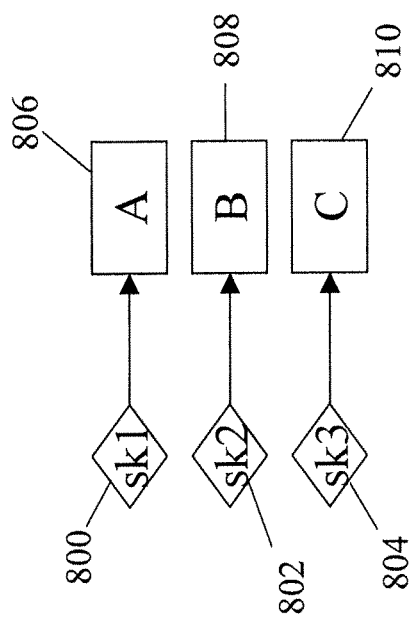
Fig. 8b
Fig. 8a
Fig. 8

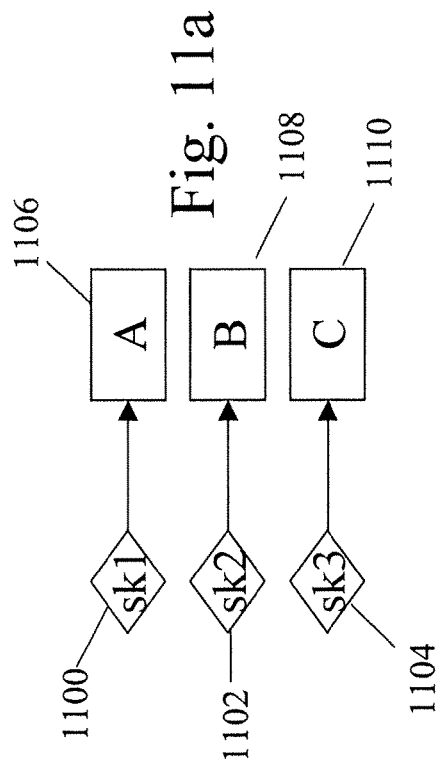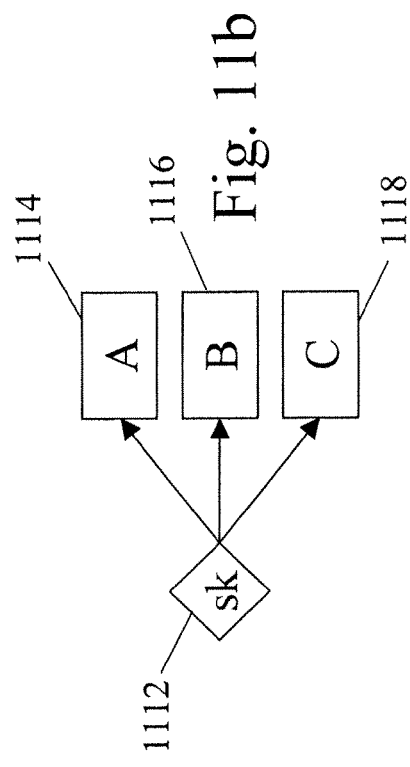
Fig. 11

AUTOMATED VALIDATION AND EXECUTION OF CRYPTOGRAPHIC KEY AND CERTIFICATE DEPLOYMENT AND DISTRIBUTION

BACKGROUND

The present invention relates generally to cryptography and, more particularly, to a system and method for automated validation and execution of cryptographic key and certificate deployment and distribution.

Key management is the process by which cryptographic keys are created according to the appropriate policies, backed up against disasters, delivered to the systems that need them on time, are under the control of the appropriate personnel, and possibly deleted at the end of their lifecycle. To avoid any error-prone manual operations, all keys are preferably managed automatically.

However, up to this point in time key deployment and distribution has been largely controlled by a human, which is prone to errors. Specifically, there is no assurance that all necessary keys are properly deployed and distributed to the precise locations where they are needed, and no assurance that an existing key deployment exposes no risks. This is because a typical enterprise key management system may involve thousands of keys and/or certificates, with many of them being updated or refreshed regularly, along with thousands of key deployment points. With such a system, the management task of timely and efficiently distributing keys is inherently complicated and error-prone.

The well-known public key infrastructure (PKI) is used for public key and certificate management. It comprises a fetch-type of interaction between the client and the PKI server. However, the PKI server has no control over certificate deployment at the client's location. Heretofore, there is no known way to represent key deployment so that key deployment can be understood by a machine, such as a computer, let alone by an automated method to validate and execute the key deployment and distribution process.

What is needed is a system and method for the automated management (i.e., validation and execution) of the deployment and distribution of cryptographic keys and/or certificates such that keys and certificates are deployed or distributed to any place where they are used to process or protect data, and not sent to places where they are not needed or not tracked, and removed from places where they should no longer exist in order to avoid risks associated with an incorrect deployment or distribution.

SUMMARY

The foregoing discussed drawbacks and deficiencies of the prior art are overcome or alleviated, in an exemplary embodiment, by a method for automated validation and execution of cryptographic key and certificate deployment and distribution, the method including providing one or more keys; providing one or more key deployment points; and distributing the one or more keys to the one or more key deployment points in an automated manner based on a mapping of each of the one or more keys to be distributed to each of the one or more key deployment points.

In another embodiment, a computer program product includes a computer readable computer program code for implementing automated validation and execution of cryptographic key and certificate deployment and distribution; and instructions for causing a computer to implement a method, the method further including providing one or more keys; providing one or more key deployment points; and distributing the one or more keys to the one or more key deployment points in an automated manner based on a mapping of each of the one or more keys to be distributed to each of the one or more key deployment points.

A system for implementing automated validation and execution of cryptographic key and certificate deployment and distribution includes a computing network including a processing device in communication with one or more computer memory storage devices; and the computing network further configured to implement a method for automated validation and execution of cryptographic key and certificate deployment and distribution, the method further including providing one or more keys; providing one or more key deployment points; and distributing the one or more keys to the one or more key deployment points in an automated manner based on a mapping of each of the one or more keys to be distributed to each of the one or more key deployment points.

BRIEF DESCRIPTION OF THE DRAWINGS

Referring to the exemplary drawings wherein like elements are numbered alike in the several Figures:

FIG. 5, including FIGS. 5a and 5b, illustrates a deployment pattern that can be used for deploying server keys and certificates for SSL-protected CSIv2;

FIG. 6, including FIGS. 6a and 6b, illustrates a deployment pattern that can provide trust between WebSeal and WAS;

FIG. 8, including FIGS. 8a and 8b, illustrates a deployment pattern that can be used in SCSI capability-based command security (CbCs);

FIGS. 10a and 10b, illustrates a continuation of FIG. 9;

FIG. 11, including FIGS. 11a and 11b, illustrates a deployment pattern that can be used for deploying symmetric encryption keys for EKM servers for use, e.g., with LTO-4 drives;

DETAILED DESCRIPTION

Figure 1:
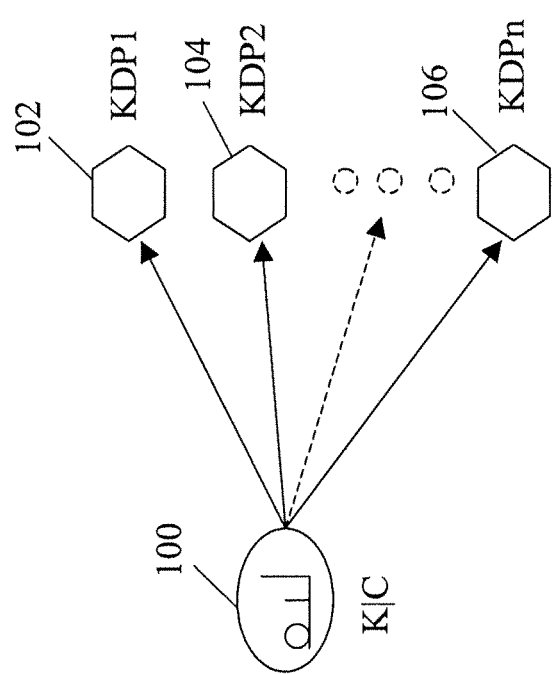
FIG. 1 illustrates a deployment pattern with a private key+certificate deployed to multiple key deployment points.

Disclosed herein is a system and method for implementing automated validation and execution of cryptographic key and certificate deployment and distribution. Briefly stated, the present invention involves automated key deployment management in an enterprise cryptographic key and/or certificate system. It can be applied to a typical distributed key/certificate management system with a centralized control point referred to as a centralized key management system (CKMS) with a large number of key deployment points (KDPs). A KDP can be many things, including, for example, a key-use entity such as any encryption/decryption device that consumes keys, or an application on a server needing a certificate. A KDP can also be a lightweight key-management point that serves as an agent for one or more key use entities (KUEs). Key using entities make use of keys to perform cryptographic operations (encryption, decryption, signature, verify). Therefore, the present invention applies to many different scenarios, regardless of the specific key management architecture, that involve managing the deployment or distribution of keys from one location to one or more other locations. The certificate/key distribution functionality is a critical component in any key management system, to guarantee having the correct key at the correct place and at the correct time. The certificate/key deployment and distribution system and method of the present invention defines a set of certificate/key deployments, each of which represents a mapping from a set of certificates/keys to a set of key deployment points.

The automated key and certificate deployment system and method of the present invention reduces the administrative effort required to work on individual deployments of keys to key deployment points such as groups of servers or applications. Instead these deployments are specified by a pre-defined deployment pattern or a composition of deployment patterns, each (pattern) of which represents a typical deployment use-case for an application. This facilitates the setup and updating of infrastructure in line with a deployment policy without manual interaction of an administrator. The advantages are that the administration of a distributed application can express its needs for keys and certificates as a deployment pattern or a composition of deployment patterns that are independent of the actual number of deployment points or keys. Not only does the deployment engine automate the process of key distribution, it can also automatically initiate the actual key generation if the keys/certificates involved in the deployment do not exist yet in the system. In addition, existing deployments react automatically to changes (e.g., addition and removal of deployment points, addition and removal and refresh of keys). Considering the fact that a typical enterprise key management system may contain from tens to hundreds of key-use entities, and potentially thousands or millions of keys, the key deployment and distribution process is preferably managed automatically in accordance with the present invention.

The following definitions apply throughout this disclosure.

Key (K) means a physical key with a period of validity ("cryptoperiod"). A key may be a secret key (symmetric key), a private key, a public key, or a private/public key pair.

Certificate (C) means a certificate that contains a public key and is signed by a private key of a certificate authority.

KeyAndCertificate (K|C) means a pair of key and certificate.

KeySet ($K^S$) means a set of related (physical or logical) keys with common properties.

CertificateSet ($C^S$) means a set of related certificates with common properties.

KeyAndCertificateSet ($K|C^S$) means a set of related bundles of keys and certificates.

KeyDeploymentPoint (KDP) means an interface through which an application that requests keys accesses them.

KeyDeploymentPointSet ($KDP^S$) means a set or bundle of related KDPs.

Intuitively, a key deployment can be viewed as an association or a mapping between a Key, a Certificate, a KeyAndCertificate, a KeySet, a CertificateSet or a KeyAndCertificateSet and a KDP or a $KDP^S$. To be more generic, a key deployment is defined as a mapping (M) between an array of certificate/key entities (denoted by $CK^E$) and an array of KDP entities (denoted by $KDP^E$). A certificate/key entity ($CK^E$) can be a K, $K^S$, C, $C^S$, K|C, or $(K|C)^S$, and a KDP entity ($KDP^E$) can be a KDP or a $KDP^S$. A key deployment mapping, M, may be defined as:

$$M:CK^E[\ ] \rightarrow KDP^E[\ ] \qquad \text{Eq. 1}$$

where $CK^E$ is from within the set of {K, $K^S$, C, $C^S$, K|C, (K|C)s}, and $KDP^E$ is from within the set of {KDP, $KDP^S$}.

Referring to FIG. 1, a complex of web servers (e.g., application servers, proxy servers, static web content servers) are deployed across multiple computing systems. These servers are sent requests according to some algorithm, but for purposes of this disclosure, all servers are expected to look/act/respond the same way to requests sent to them. Further, each system needs to be able to run even when one or more of the other systems may not be running. The web servers (serving requests over the HTTP protocol) are expected to support HTTPS (i.e., SSL/TLS-protected) communications. At the very least, server-side authentication is required. Thus, for each web server, a private key (and corresponding attached certificate or self-signed certificate holding the public key) is configured for use by the web server. Since all servers are expected to be considered the same server, the same private key+certificate must be configured into each web server. In this scenario, the private key+certificate is K|C 100, the multiple web servers are KDPs (KDP1 102, KDP2 104, . . . KDPn 106), and it is required that the K|C 100 be deployed to each of the KDPs 102-106.

Multiple Encryption-Key Managers (EKMs), an IBM module that serves keys/certificates to tape drives, are common in a client installation in order to support banks of tape drives or to provide failover between the EKM instances. IBM TS 1040 (LTO-4) drives make use of AES or 3DES symmetric keys stored in a keystore. These keys are accessed by the EKM during the read or write operations of tape encryption. The EKM can make use of a wide array of keystores to store key material. The KDPs are then the locations of the keystores that the EKM knows about, from which it gets the appropriate keys.

Figure 2:
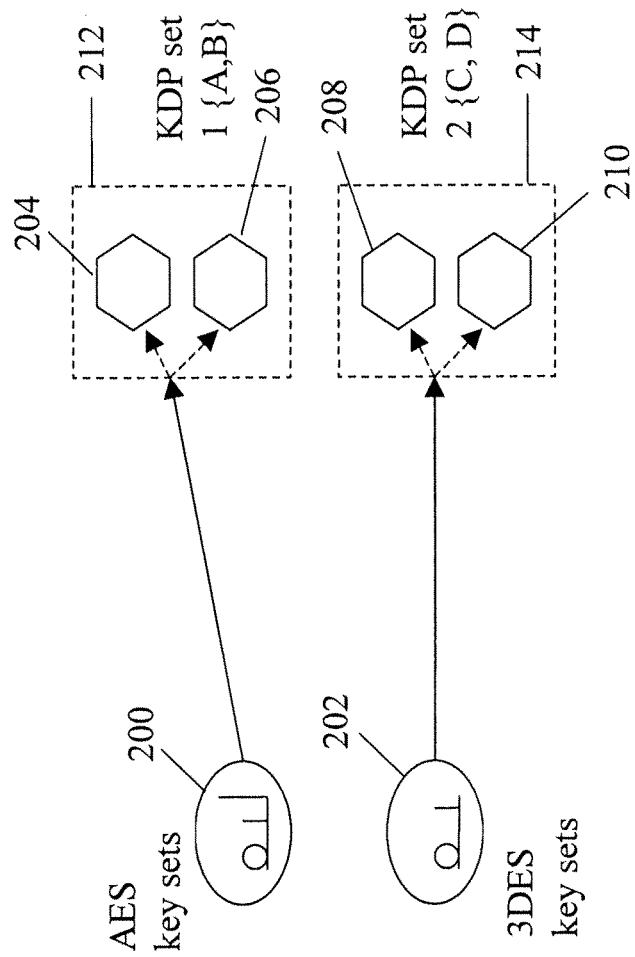
FIG. 2 illustrates a deployment pattern with two different key sets each deployed to a pair of key deployment points.

Referring to FIG. 2, two sets of keys exist, one set 200 composed of AES keys and the other set 202 comprising 3DES keys. There are four EKMs, each with a keystore, to serve tape drives. The four EKMs operate in pairs, with each pair using the same sets of keys and serving the same tape drives (a typical failover configuration). There are multiple ways to describe the key deployment, for example, one way is to set up four KDPs 204-210 and each key set 200, 202 goes to two KDPs 204-210. The drawback of this scheme is that it is not explicit as to which KDPs 204-210 are grouped. Therefore a better solution, as illustrated in FIG. 2, is to use two KDP sets 212, 214, each of which represents a failover relationship.

A key deployment scheme comprises three components: (1) a key deployment source embodied by an array of certificate/key entities; (2) a key deployment destination embodied by an array of KDP entities; and (3) a deployment pattern specifying the distribution of keys/certificates from a source to a destination. The following defines a deployment pattern. As described hereinabove, a key deployment comprises a mapping between the deployment source and the deployment destination. The deployment source is an array of certificate/key entities such as K, $K^S$, C, $C^S$, K|C, $(K|C)^S$, etc., and the deployment destination is an array of KDP entities such as KDP or the KDP sets. If the deployment source has m entities and the deployment destination has n entities, the mapping can be represented by an m×n 0-1 matrix, with "1" denoting that a "key should exist or be deployed in the KDP" and "0" denoting that a "key is absent from or not deployed to the KDP". The matrix is an adjacent incidence matrix representing the edges of a graph connecting entities in the deployment source and deployment destination. More specifically, each column in the deployment matrix corresponds to each entity in the deployment source, and each row specifies a "yes-or-no" deploying decision to the corresponding KDP or KDP set in the deployment destination. A 1 at j-th row and j-th column thus stipulates that i-th key (or key set) in the deployment source should be deployed to j-th KDP (or KDP set) in the deployment destination.

In a first example, a single entity is in the deployment source and n entities are in the deployment destination. Thus, 1×n key deployment matrix is [1 1 ... 1], which means the key is deployed to each of the n KDPs. In a second example, two entities are in the deployment source, with one entity being AES keys and the other being 3DES keys, and there are two entities, i.e., KDP sets that host the AES and 3DES keys respectively. Accordingly, the 2×2 deployment matrix is:

$$D = \begin{pmatrix} 1 & 0 \\ 0 & 1 \end{pmatrix}$$

If we define KDP sets as 4 entities instead of grouping the pair of KDPs for failover, the 2×4 deployment matrix is:

$$D = \begin{pmatrix} 1 & 1 & 0 & 0 \\ 0 & 0 & 1 & 1 \end{pmatrix}$$

This representation is relatively more complex than the previous one, and it lost the information about the pairing of KDPs for the purpose of failover. This justifies the need to use the KDP set as an entity in the deployment destination.

In a centralized cryptography key management system, there will be many key deployment instances, each of which corresponds to specific applications with their own deployment source and destination. The aggregated deployment sources are seen as a large key set containing all key/keysets managed by the system, and the aggregated deployment destinations are seen as a large KDP set consisting of each KDP known to the system. The KDPs may be keystores under the control of a key lifecycle manager (KLM). The resulting visualization of the deployment of the entire system can be based on a large matrix, most likely, a very sparse matrix.

With the generic matrix representation for the deployment, one can define deployment patterns for typical application scenarios. Based on a detailed study of use cases for a centralized key management system, the following common deployment patterns can be identified, each of which being referred to herein as a "deployment pattern."

Secret shared: There is a need to deploy a secret key or a set of secret keys to multiple KDPs (e.g., servers). For example, one location is doing the task of encryption and another location is performing decryption, and both locations need to use the same secret key (symmetric key). The graph of a pattern "secret shared" is exactly the same as that of the first example described above (note that the key is a secret key). The 1×n deployment matrix is an all-1's row.

Secret unique: This refers to the need to deploy different secret key or key sets to different locations with one-to-one correspondence, for example, for tasks such as encryption/decryption. This describes the scenario of the second example given above, characterized by a diagonal matrix.

Private and public key shared: This deployment graph (and matrix) is the same as that of the first example given above with respect to FIG. 1. Note that a pair (or a set of pairs) of private and public keys is deployed to multiple KDPs, possibly with a certificate.

Private and public key unique: This pattern is similar to the second example given above. Defining each key set as a pair of private and public keys, the deployment graph (and matrix) is then exactly the same as that of the second example given above with respect to FIG. 2.

Private shared: This is the same as the Secret Shared scenario above, except that the key is private key instead of secret key. The deployment graph (and the matrix) remains unchanged. A use case is the deployment of a private key to multiple KDPs for business-partner exchange data import.

Public shared: This is the same as the Secret Shared scenario above, except that the key is public key (or certificate) instead of secret key. The deployment graph (and the matrix) remains unchanged. A use case is the deployment of a public key to multiple KDPs for business-partner exchange data export.

Figure 3:
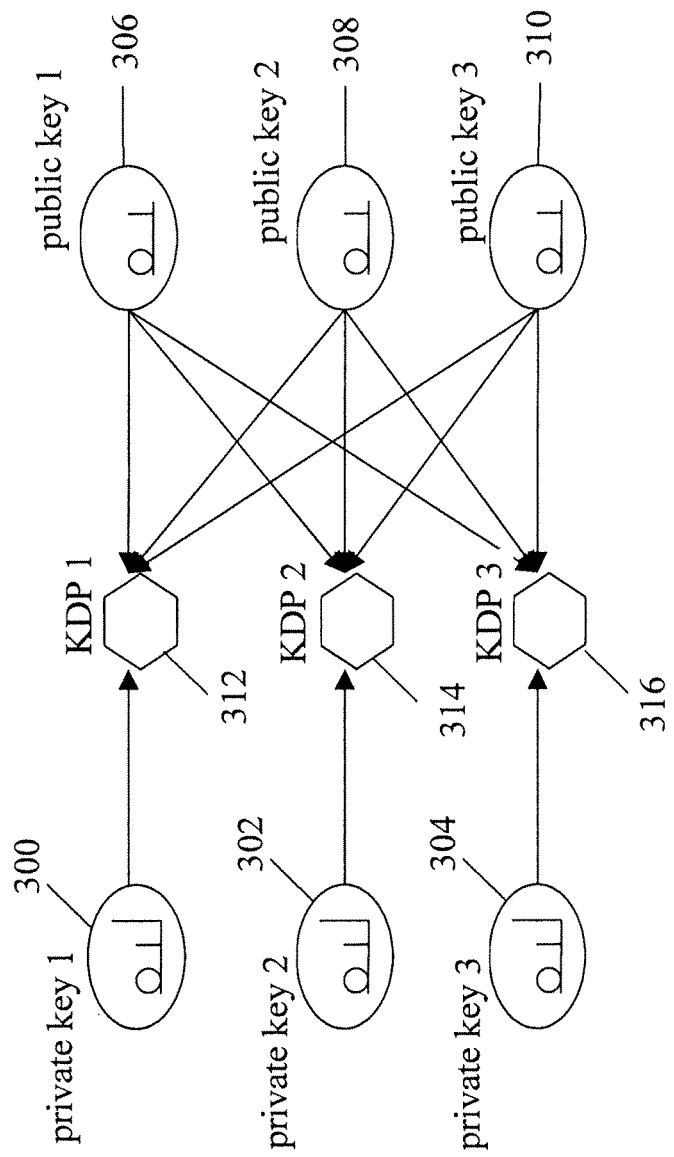
FIG. 3 illustrates a private unique public shared deployment pattern.

Private unique public shared: In the scenario of deploying private/public key pairs with self-signed certificates for a server cluster, each private key will go to its corresponding KDP server only, while the public keys possibly with self-signed certificates will be deployed to all KDP servers in the cluster. FIG. 3 illustrates this scenario. In FIG. 3, if we define the set of deployment sources 300-310 as {private key 1, private key 2, private key 3, public key 1, public key 2, public key 3}, and define the destinations 312-316 as {KDP1, KDP2, KDP3}, the resulting deployment matrix is:

$$D = \begin{pmatrix} 1 & 0 & 0 \\ 0 & 1 & 0 \\ 0 & 0 & 1 \\ 1 & 1 & 1 \\ 1 & 1 & 1 \\ 1 & 1 & 1 \end{pmatrix}$$

The matrix captures the actual information of which key(s) goes to which KDP(s), whereas the deployment pattern describes only generically the mapping, independently of the number of key(s) and KDP(s).

In order to support more deployment patterns, one can enrich the aforementioned pre-defined patterns by introducing new patterns based on reasonable use cases. It is also possible to extend the pre-defined patterns by composing new patterns from existing patterns.

A key deployment can be created or modified manually by an administrator or agent, or can be generated or changed automatically by the requirement of an application. The key management system continuously monitors the key deployments to guarantee their validity and to be compliant with an exemplary key distribution policy, defined below. Before a candidate key deployment is accepted by the key management system, the deployment is validated against the following three Non-Null rules: (1) the deployment source should not be empty; (2) the deployment destination should not be empty; and (3) the deployment matrix should contain at least one 1. Otherwise the deployment specification is not valid and will not be accepted by key management system.

For simplicity, it is recommended that all-zero rows and all-zero columns in the deployment matrix be eliminated. Each all-zero row can be eliminated by deleting the corresponding key or key set from the deployment source, and each all-zero column can be eliminated by deleting the corresponding KDP or KDP sets. To avoid the same key being required to be deployed to the same KDP more than once in a key deployment, care must be taken when composing entities in deployment source and KDP entity in the destination. It is stipulated that a specific key should not appear more than once in the key deployment source and a specific KDP should not appear more than once in the key deployment destination. The actual key deployments in key management system are often governed by a corporate- or department-wide security policy concerning key distribution. One example of a key distribution policy is to impose the minimum-risk key distribution requirement, i.e., never deploy a key to a KDP that is not necessary. Another example is to never deploy a key to a wrong KDP; for example, if a KDP is configured only for the purpose of verifying signatures, secret keys or private keys are not allowed to be deployed to that KDP. The key management system preferably continuously checks whether the actual key deployment is compliant with the policy. Once a valid key deployment is in place, then an administrator, an application, or a policy enforcer may modify the existing key deployment to meet changing business needs. As mentioned above, a key deployment scheme comprises three components: deployment source, deployment destination, and deployment pattern (matrix), each of which might be changed or modified to accommodate application changes. Any key found in a location where there is a 0 for that combination represents an error in the deployment and something to be fixed. Thus, a key deployment may be validated by checking the actual contents of a KDP with what is expected based on the deployment matrix.

An entity in a key deployment source can be either a key or a key set. Therefore, there are four cases relating to changing the key deployment source, i.e., adding a key (or key set) as a new entity, deleting a key (or key set) entity, adding a key into an existing key set, and deleting a key from an existing key set. To add a key (or key set) as a new entity into the key deployment source, the deployment matrix will request an additional row to specify the deployment requirement, such as whether the key or key set should be deployed to each KDP (or KDP set) in the deployment destination. The new row is specified either by an administrator or any other actors that initialize the adding operation. The key management system will record the new key deployment representation, and implement the actual distribution of the key or key sets. To delete an existing key (or key set) that is an entity in deployment source, a corresponding row in deployment matrix will be deleted accordingly. The key management system will request the KDP or KDP sets (or the administrator who manage KDPs) to stop the use of the key and to remove it. To add a key into an existing key set, there is no need to modify the current deployment matrix. Nevertheless, key management system simply distributes the new key to KDPs according to the row corresponding to that key set. The same procedure applies to the case when a key is added to an existing key (as an entity) to form a key set in the key deployment source. To delete a key from an existing key set, there is again no need to modify the current key deployment matrix. Key management system will request KDPs according to the row corresponding to that key set to stop the use of the key and to remove it from KDPs.

An entity in deployment destination can be either a KDP or a KDP set. Therefore, four cases exist relating to changing key deployment destination, i.e., adding a KDP (or KDP set) as a new entity, deleting a KDP (or KDP set) that is an entity, adding a KDP into an existing KDP entity, and deleting a KDP from an existing KDP entity. To add a KDP (or KDP set) as a new entity into key deployment destination, deployment matrix will need an additional column to specify deployment requirement such as whether an existing key or key set should be additionally deployed to it. The new column can be automatically generated according to deployment pattern or be specified by an administrator. Key management system will record the modified key deployment representation, and implement the actual distribution of the key or key sets. To delete an existing KDP (or KDP set) that is an entity in deployment destination, a corresponding column in key matrix representation will be deleted accordingly. All keys (key sets) corresponding to the 1's in the deleted column will be removed from the KDP (KDP set), and then the KDP (or KDP set) will be removed from deployment destination. To add a KDP into an existing KDP set, there is no need to modify current key deployment matrix. Nevertheless, key management system has to distribute keys to the new KDP according to the column corresponding to that KDP set. The same procedure applies to the case when a KDP is grouped with an existing KDP (which is an element) to form a KDP set in key deployment destination. To delete a KDP from an existing KDP set, there is again no need to modify current key deployment matrix. However the keys corresponding to 1s in the column matched to the KPD set will be removed for the KDP to be deleted, and then the KDP will be removed from the KDP set. If the KDP set is empty, then a process to delete an entity in deployment destination shall be started.

Apart from changing deployment source and deployment destination inside a deployment, deployment matrix itself may also be changed. For example, one might want to deploy a key or key set to a KDP (or a KDP set) where it was not previously deployed. This corresponds to changing a 0 into 1 at the correct position in the deployment matrix and distributing the involved key or key set to the correct KDP (or each KDP in a KDP set); one might also want to cancel a deployment of a key or key set to a KDP (or a KDP set). This involves changing a 1 into 0 at the correct position in the deployment matrix and requesting the deletion of the involved key or key set to a KDP (or KDP set).

In some deployment patterns, the addition of a KDP will require not only the creation of an additional column, but also of an additional row for the new key that must be generated and deployed to that KDP. For all patterns with keyword "unique", adding a new KDP into a deployment means adding a new key source as well which goes to that KDP. Hence, changing to this new key deployment involves two actions, namely changing key deployment source and deployment destination. The administrator specifies a newly-added KDP, and the system will automatically figure out and generate as many keys as necessary and change key deployment according to deployment pattern. Similarly, one can also change the key deployment pattern from one to another.

With the formulation of key deployment calculations defined based on matrix operations, a computer (or computer program) can then understand the stored current and desired key distribution and perform automated deployment validation and execution of key deployment, in accordance with the system and method of the present invention. A generic procedure is presented to accomplish this task, featuring a binary, cell-by-cell minus operation to calculate the delta changes necessary to transform from the current to the desired key deployment. The procedure to perform key deployment changes may be defined as follows:

Validate the proposed change (e.g., by the administrator) against the key distribution policy; if compliant, accept the change.

Compare the new deployment representation with the original one, identifying the resulting deployment actions (e.g. remove or add a key/keyset from or to a KDP)

1. Create the union of the desired and current deployment source.
2. Create the union of the desired and current deployment destination.
3. Expand the desired and current deployment matrices according to the union, filling 0s in the respective new entries.
4. Obtain the delta matrix by subtracting the current expanded deployment matrix from the desired expanded matrix. The resulting delta matrix is a matrix of "1, 0, −1" values, which indicate "add, no change, delete" operations that are required to "make it right". For a 1 in the delta matrix at i-th row and j-th column, the system issues a "add i-th key/keyset" command to j-th KDP (or KDP set), and for each −1 at s-th row and k-th column, the system issues a "delete s-th key/keyset" command to k-th KDP (or KDP set).

If the deployment is newly created, the above procedure applies as well as if the original deployment source, deployment destination, and deployment matrix are empty.

To illustrate the above algorithm, an exemplary current deployment includes deployment source being defined as {key1, key2, key3}, deployment destination being defined as {KDP1, KDP2, KDP3}, and deployment matrix being defined as:

$$D_{cur} = \begin{pmatrix} 1 & 1 & 0 \\ 0 & 1 & 1 \\ 1 & 0 & 1 \end{pmatrix}.$$

For some reasons, the administrator may decide to add a new KDP called KDP4 into the deployment, then the desired deployment destination set becomes {KDP1, KDP2, KDP3, KDP4}, and the administrator adjusts the deployment matrix as follows:

$$D_{des} = \begin{pmatrix} 1 & 0 & 0 & 1 \\ 0 & 1 & 0 & 1 \\ 0 & 0 & 1 & 1 \end{pmatrix}.$$

The algorithm proceeds as follows:
a) Compute the union of the current and desired deployment source, which is {key1, key2, key3};
b) Compute the union of the current and desired deployment destination, which is {KDP1, KDP2, KDP3, KDP4};
c) Determine the expanded current and desired deployment matrices based on the two union sets:

$$D'_{cur} = \begin{pmatrix} 1 & 1 & 0 & 0 \\ 0 & 1 & 1 & 0 \\ 1 & 0 & 1 & 0 \end{pmatrix},$$

and $$D'_{des} = \begin{pmatrix} 1 & 0 & 0 & 1 \\ 0 & 1 & 0 & 1 \\ 0 & 0 & 1 & 1 \end{pmatrix},$$

respectively.

d) Finally computing the delta of the above two matrices yields $$\text{Delta} = D'_{des} - D'_{cur} = \begin{pmatrix} 0 & -1 & 0 & 1 \\ 0 & 0 & -1 & 1 \\ -1 & 0 & 0 & 1 \end{pmatrix}$$

and accordingly the algorithm will then issue the following commands: remove key1 from KDP2, add key1 to KDP4, remove key2 from KDP3, add key2 to KDP4, remove key3 from KDP 1, and add key3 to KDP4.

To further illustrate the system and method of the present invention for automated validation and execution of cryptographic key and certificate deployment and distribution, a number of use-case scenarios will now be described. Specifically, the use case scenarios describe various key deployment patterns in a high level key lifecycle manager (KLM). Note that for one use case there may be one or more deployment patterns accordingly. In the exemplary scenarios that follow, "K" indicates a public and/or private key, and "C" is a public key certificate, either self-signed or signed by a certification authority (CA), which is an entity that delivers certificates on public keys after verifying the identity of the owner of the private key. Within one or more of the scenarios, an application may require multiple key deployments, each with a different set of KDPs. Note that the import of a business partner's certificate and export of our own certificate to/from KLM is outside the scope of the deployments described. Only the deployments within KLM are captured. Also, "sk" and "k/K" represent key groups. A key group contains one or more keys which are deployed using at least one specific deployment pattern. Further, "A", "B", and "C" represent key deployment points such as keystores under the control of a KLM.

Figure 4:
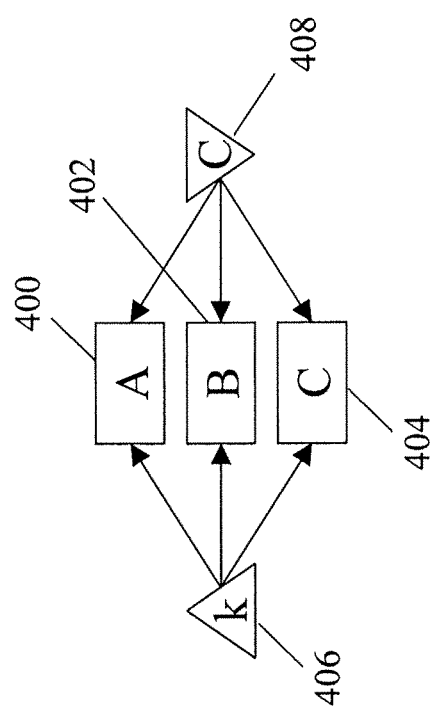
FIG. 4 illustrates a deployment pattern that can be used for deployment of server keys and certificates for SSL-TLS HTTPS.

Referring to FIG. 4, there illustrated is a use case scenario involving a deployment of server keys and certificates for SSL-TLS HTTPS. It features a cluster of web servers 400-404 supporting HTTPS, where each server is considered to be the same server from a client perspective. At least server-side authentication is required in this scenario. This scenario utilizes the same private key, K, 406 and public key certificate, C, 408, which must be configured. Also, there is automated refreshment of the key pair 406-408 upon expiry.

Referring to FIG. 5, including FIGS. 5a and 5b, there illustrated is a use case scenario involving server keys 500-504 and certificates 506-510 for SSL-protected CSIv2. This includes a group of J2EE servers 512-516 communicating using the CSIv2 protocol. Each server 512-516 has a unique private key 500-504 and associated digital certificate 506-510, either self-signed or CA signed. FIG. 5a illustrates the key deployment using the private unique public shared pattern, where the certificates are self-signed. FIG. 5b illustrates the key deployment using the private unique public unique pattern, where the certificates are signed by a CA.

Referring to FIG. 6, including FIGS. 6a and 6b, there illustrated is a use case scenario involving trust between WebSeal and WAS for a vendor-specific product. This involves SSL connections which need to be set up between WebSeal WAS and the HTTP server. The resulting key deployment is the same as illustrated in FIG. 5. That is, this use case scenario involves server keys 600-604, certificates 606-610 and a group of servers 612-616. Each server 612-616 has a unique private key 600-604 and associated digital certificate 606-610, either self-signed or CA signed. FIG. 6a illustrates the key deployment using the private unique public shared pattern, where the certificates are self-signed. FIG. 6b illustrates the key deployment using the private unique public unique pattern, where the certificates are signed by a CA.

Figures 7, 7A, 7B:
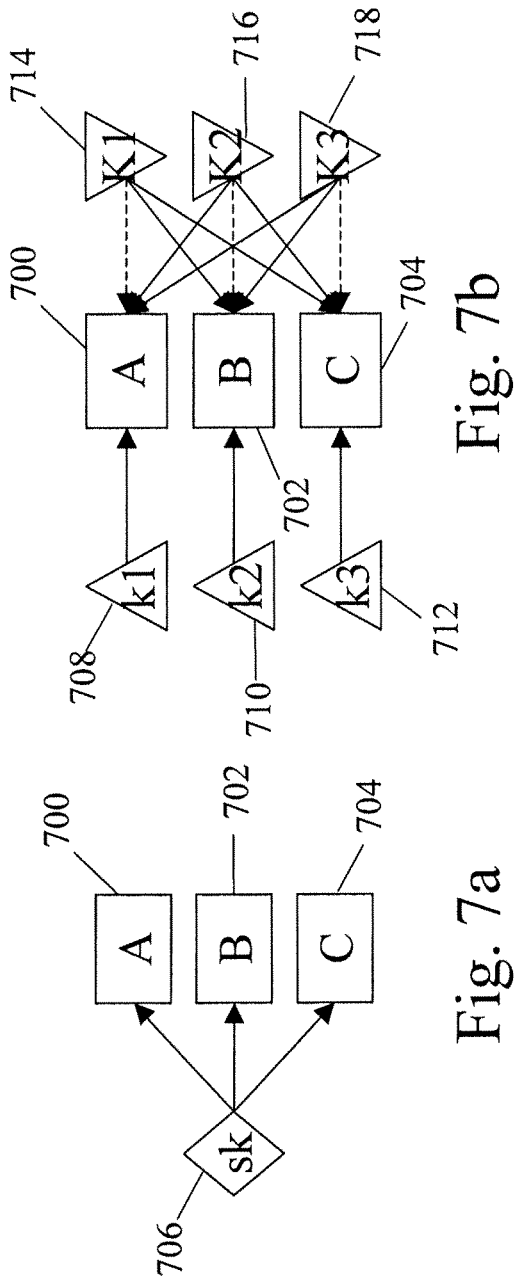
FIG. 7, including
FIGS. 7a and 7b, illustrates a deployment pattern that can used in the scenario in which keys are set up for LTPA token generation and verification for both WebSeal and WAS.

Referring to FIG. 7, there illustrated is a use case scenario in which keys are set up for LTPA token generation and verification for both WebSeal and WAS. This includes multiple WAS servers 700-704 acting as a cluster and communicating the identity of a requestor of a service by use of LTPA. The LTPA token is cryptographically generated and protected, using both a symmetric encryption key as well as a public/private key for encryption and signing/verifying the LTPA token format. FIG. 7a illustrates a key deployment using the secret shared pattern in which a secret key 706 is in a shared deployment among the servers 700-704. FIG. 7b illustrates a key deployment using the private unique public shared pattern in which each server 700-704 has an associated private key 708-712, as well as each server 700-704 having each one of public key 714-718.

Referring to FIG. 8, including FIGS. 8a and 8b, there illustrated is a use case scenario involving SCSI capability-based command security CbCs). CbCs involves three active entities: an application client; a client storage; and a security manager. Requests to the storage device must be accompanied by a cryptographically secured capability; i.e., a pair [CAP; Ckey]. Ckey (Capability Key) is a cryptographic hash taken over the capability using a symmetric secret key shared by the security manager and the storage device. KLM simplifies the maintenance of the working keys by automating their refresh and deployment to the appropriate storage device(s) and security manager. FIG. 8a illustrates the key deployment using the secret unique pattern in which each of different secret keys 800-804 is deployed to a corresponding storage device 806-810. FIG. 8b illustrates the key deployment using the secret shared pattern in which the secret key 812 containing similar secret keys are deployed to the security manager and its backup(s) 814-818. The equivalent is if the security manager is composed of a cluster of servers that must all have all keys.

Figure 9:
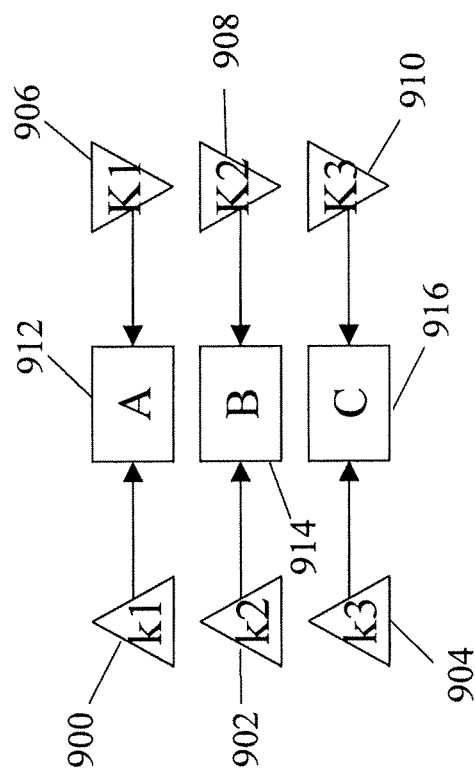
FIG. 9 illustrates a deployment pattern that can be used for deploying public and private keys for EKM servers for use, e.g., with IBM's TS1120 drives.

Referring to FIG. 9, there illustrated is a use case scenario in which private keys 900-904 and public keys 906-910 (without certificates) for EKM servers 912-916 for use, e.g., with IBM's TS1120 drives. This involves multiple EKM servers to support banks of tape drives or to provide failover between instances of the EKM, and makes use of RSA private and public keys. The key deployment comprises an internal operation utilizing the private key unique public key unique pattern.

Figure 10:
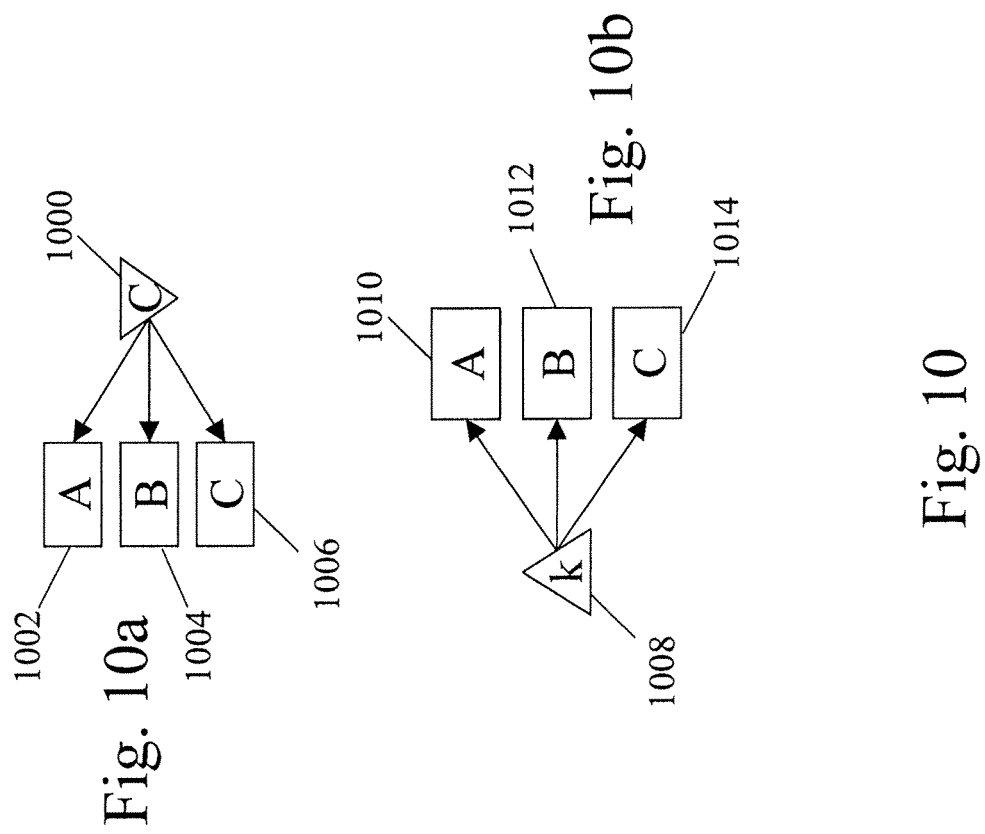
FIG. 10, including

Referring to FIG. 10, including FIGS. 10a and 10b, there illustrated is a continuation of the use case scenario of FIG. 9. In FIG. 10a, data are exported to a business partner of someone using the public key (possibly) shared pattern. "C" on the right hand side of this figure is the business partner's CA-signed certificate 1000 obtained by KLM and A, B and C are keystores 1002-1006 used at EKMs. In FIG. 10b, the business partner receives the CA-signed certificate and encrypts data with it which are sent to that someone, wherein "k" 1008 is the private key used to decrypt the data at A, B and C 1010-1014.

Referring to FIG. 11, including FIGS. 11a and 11b, there illustrated is a use case scenario involving symmetric encryption keys for EKM servers for use, e.g., with LTO-4 drives. This scenario makes use of AES or 3DES keys. FIG. 11a illustrates the key deployment comprising an internal operation using the secret unique pattern in which secret keys 1100-1104 are deployed each to an associated keystore A, B and C 1106-1110. FIG. 11b illustrates the key deployment comprising an export and import of data using the secret (possibly) shared pattern. The business partner uses someone's public key to wrap the partner's symmetric keys for data encryption which are then sent to that someone. That someone can use his/her private key to unwrap the business symmetric keys, sk 1112, which are deployed to A, B and C 1114-1118.

Another possible use case scenario (not shown) involves CCA PIN keys, where the actual key generation and storage are locally managed at the KLM since the keys are hardware protected. KLM provides an administrative interface for defining policies for generation and lifecycle management of keys.

Still another possible use case scenario (not shown) involves centralized key management for effective protection and recovery. The features of this scenario include the management of cryptographic keys across multiple applications as well as across multiple layers of the infrastructure stack, in a centralized manner.

Also, a use case scenario (not shown) may involve management of encryption keys to support regulatory compliance. Features of this scenario include that KLM delivers an auditing report to prove that data are encrypted in a secure manner and all related keys are centrally managed correctly.

Yet another possible use case scenario (not shown) involves maintaining website availability through automatic certificate refresh. Features of this scenario include automatic refresh near the expiration of the certificate to avoid web server downtime due to certificate expiration.

Figure 12:
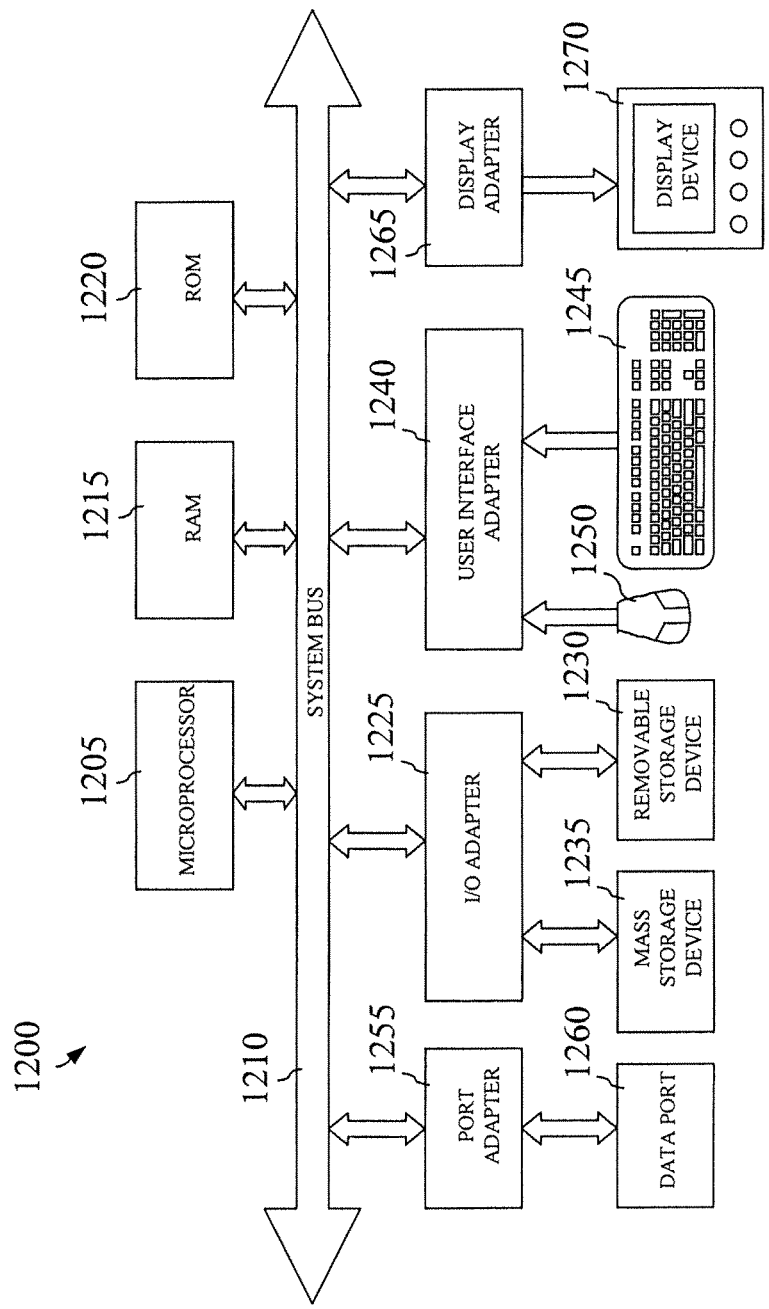
FIG. 12 is a schematic block diagram of a general-purpose computer suitable for practicing embodiments of the present invention.

Generally, the method embodiments for implementing automated validation and execution of cryptographic-key and certificate deployment and distribution may be practiced with a general-purpose computer and the method may be coded as a set of instructions on removable or hard media for use by the general-purpose computer. FIG. 12 is a schematic block diagram of a general-purpose computer suitable for practicing embodiments of the present invention. In FIG. 12, computer system 1200 has at least one microprocessor or central processing unit (CPU) 1205. CPU 1205 is interconnected via a system bus 1210 to a random access memory (RAM) 1215, a read-only memory (ROM) 1220, an input/output (I/O) adapter 1225 for a connecting a removable data and/or program storage device 1230 and a mass data and/or program storage device 1235, a user interface adapter 1240 for connecting a keyboard 1245 and a mouse 1250, a port adapter 1255 for connecting a data port 1260 and a display adapter 1265 for connecting a display device 1270.

ROM 1220 contains the basic operating system for computer system 1200. The operating system may alternatively reside in RAM 1215 or elsewhere as is known in the art. Examples of removable data and/or program storage device 1230 include magnetic media such as floppy drives and tape drives and optical media such as CD ROM drives. Examples of mass data and/or program storage device 1235 include hard disk drives and non-volatile memory such as flash memory. In addition to keyboard 1245 and mouse 1250, other user input devices such as trackballs, writing tablets, pressure pads, microphones, light pens and position-sensing screen displays may be connected to user interface 1240. Examples of display devices include cathode-ray tubes (CRT) and liquid crystal displays (LCD).

A computer program with an appropriate application interface may be created by one of skill in the art and stored on the system or a data and/or program storage device to simplify the practicing of this invention. In operation, information for or the computer program created to run the present invention is loaded on the appropriate removable data and/or program storage device 1230, fed through data port 1260 or typed in using keyboard 1245.

In view of the above, the present method embodiments may therefore take the form of computer or controller implemented processes and apparatuses for practicing those processes. The disclosure can also be embodied in the form of computer program code containing instructions embodied in tangible media, such as floppy diskettes, CD-ROMs, hard drives, or any other computer-readable storage medium, wherein, when the computer program code is loaded into and executed by a computer or controller, the computer becomes an apparatus for practicing the invention. The disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits. A technical effect of the executable instructions is to implement the exemplary method described above.

While the invention has been described with reference to a preferred embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for implementing automated validation and execution of cryptographic key and certificate deployment and distribution utilizing a computer processor, the method comprising:
    configuring the computer processor to provide one or more keys and automatically generate one or more keys on demand during deployment;
    providing one or more key deployment points;
    distributing the one or more keys to the one or more key deployment points in an automated manner based on a pattern-based mapping of each of the one or more keys to be distributed to each of the one or more key deployment points;
    automatically adding and removing the key deployment points in response to the distribution of the one or more keys, wherein the key deployment changes are implemented by:
        creating a desired deployment matrix based on the union of the desired deployment source and the current deployment source and on the union of the desired deployment destination and the current deployment destination; and
    automatically updating the one or more keys in response to the distribution of the one or more keys, wherein updating the one or more keys is at least partly based on a previous distribution of each of said one or more keys.

2. The method of claim 1, wherein a certificate is attached to certain ones of the one or more keys, and the key deployment is changed automatically by a requirement of an application.

3. The method of claim 1, wherein mapping of each of the one or more keys to be distributed to each of the one or more key deployment points comprises creating a matrix that indicates to which of the one or more key deployment points each of the one or more keys are to be mapped to.

4. The method of claim 1, wherein distributing the one or more keys to the one or more key deployment points in an automated manner is performed using one or more deployment patterns, wherein each deployment contains three parts: deployment source, deployment destination and the deployment pattern that represents a deployment requirement of the distribution of the one or more keys to the one or more key deployment points.

5. The method of claim 4, wherein at least one of the deployment patterns includes each pattern of the group comprising secret shared, secret unique, private and public shared, private and public key unique, private shared, public shared, and private unique public shared.

6. The method of claim 4, wherein new deployment patterns can be added to existing ones of the deployment patterns or can be created with a composition of existing ones of the deployment patterns.

7. The method of claim 1, further comprising validating the distributing of the one or more keys to the one or more key deployment points against one or more rules.

8. The method of claim 1, further comprising validating the distributing of the one or more keys using the deployment matrix as a checking function to verify that what is found in a key deployment point is what is expected or supposed to be in the key deployment point.

9. The method of claim 1, further comprising modifying the distributing of the one or more keys to the one or more key deployment points by modifying at least one of the one or more keys, by modifying at least one of the one or more key deployment points, and/or by modifying the mapping of each of the one or more keys to be distributed to each of the one or more key deployment points.

10. The method of claim 1, further comprising using an algorithm of a delta calculation of a deployment matrix to determine the changes a key lifecycle manager must make to bring the key deployment points to be set up with the appropriate keys and/or certificates after a change of policy or after a change by an administrator.

11. A computer program product, comprising:
    computer readable computer program code stored on a non-transient computer readable storage medium for implementing automated validation and execution of cryptographic key and certificate deployment and distribution; and
    instructions for causing a computer to
        provide one or more keys;
        provide one or more key deployment points; and
        distribute the one or more keys to the one or more key deployment points in an automated manner based on a mapping of each of the one or more keys to be distributed to each of the one or more key deployment points;
        create a desired deployment matrix based on the union of the desired deployment source and the current deployment source and on the union of the desired deployment destination and the current deployment destination;

subtract the current deployment matrix from the desired deployment matrix; and automatically update the one or more keys in response to the distribution of the one or more keys, at least partly based on a previous distribution of each of said one or more keys.

12. The computer program product of claim 11, wherein a certificate is attached to certain ones of the one or more keys, and the key deployment is changed automatically by a requirement of an application.

13. The computer program product of claim 11, wherein mapping of each of the one or more keys to be distributed to each of the one or more key deployment points comprises creating a matrix that indicates to which of the one or more key deployment points each of the one or more keys are to be mapped to.

14. The computer program product of claim 11, wherein distributing the one or more keys to the one or more key deployment points in an automated manner is performed using one or more deployment patterns, wherein each deployment pattern represents a deployment pattern of the distribution of the one or more keys to the one or more key deployment points.

15. The computer program product of claim 14, wherein the deployment patterns are from the group comprising secret shared, secret unique, private and public key shared, private and public key unique, private shared, public shared, private unique public shared.

16. The computer program product of claim 14, wherein new deployment patterns are created by composing existing ones of the deployment patterns.

17. The computer program product of claim 11, further comprising validating the distributing of the one or more keys to the one or more key deployment points against one or more rules.

18. The computer program product of claim 11, further comprising modifying the distributing of the one or more keys to the one or more key deployment points by modifying at least one of the one or more keys, by modifying at least one of the one or more key deployment points, and/or by modifying the mapping of each of the one or more keys to be distributed to each of the one or more key deployment points.

19. A system for implementing automated validation and execution of cryptographic key and certificate deployment and distribution, comprising:

a computing network including a processing device in communication with one or more computer memory storage devices, the computing network being configured to implement a method for automated validation and execution of cryptographic key and certificate deployment and distribution, the method including:

providing one or more keys;

providing one or more key deployment points; and distributing the one or more keys to the one or more key deployment points in an automated manner based on a mapping of each of the one or more keys to be distributed to each of the one or more key deployment points, wherein each of the one or more keys does not appear more than once in the same key deployment point;

creating a desired deployment matrix based on the union of the desired deployment source and the current deployment source and on the union of the desired deployment destination and the current deployment destination; and automatically updating the one or more keys in response to the distribution of the one or more keys, wherein updating the one or more keys comprises removing the one or more keys from at least one of the one or more key deployment points based at least partly on a previous distribution of keys.

20. The system of claim 19, wherein a certificate is attached to certain ones of the one or more keys.

21. The system of claim 19, wherein mapping of each of the one or more keys to be distributed to each of the other one or more key deployment points comprises creating a matrix that indicates to which of the one or more key deployment points each of the one or more keys are to be mapped to.

22. The system of claim 19, wherein distributing the one or more keys to the one or more key deployment points in an automated manner is performed using one or more deployment patterns, wherein each deployment pattern represents a deployment pattern of the distribution of the one or more keys to the one or more key deployment points.

23. The system of claim 22, wherein the patterns are from the group comprising secret shared, secret unique, private and public key shared, private and public key unique, private shared, public shared, private unique public shared.

24. The system of claim 19, further comprising validating the distributing of the one or more keys to the one or more key deployment points against one or more rules.

25. The system of claim 19, further comprising modifying the distributing of the one or more keys to the one or more key deployment points by modifying at least one of the one or more keys, by modifying at least one of the one or more key deployment points, and/or by modifying the mapping of each of the one or more keys to be distributed to each of the one or more key deployment points.

* * * * *